United States Patent
Kakkad

(10) Patent No.: US 9,839,071 B2
(45) Date of Patent: Dec. 5, 2017

(54) TRAVERSAL OF WIRELESS PROFILES

(71) Applicant: Vishal Kakkad, Aliso Viejo, CA (US)

(72) Inventor: Vishal Kakkad, Aliso Viejo, CA (US)

(73) Assignee: Lantronix, Inc., Irvine, CA (US)

( * ) Notice: Subject to any disclaimer, the term of this patent is extended or adjusted under 35 U.S.C. 154(b) by 135 days.

(21) Appl. No.: 14/817,085

(22) Filed: Aug. 3, 2015

(65) Prior Publication Data

US 2015/0341983 A1 Nov. 26, 2015

Related U.S. Application Data

(63) Continuation of application No. 13/890,191, filed on May 8, 2013, now Pat. No. 9,131,530.

(60) Provisional application No. 61/644,173, filed on May 8, 2012.

(51) Int. Cl.
| | |
|---|---|
| H04W 4/00 | (2009.01) |
| H04J 3/16 | (2006.01) |
| H04W 88/06 | (2009.01) |
| H04W 8/18 | (2009.01) |

(52) U.S. Cl.
CPC .......... *H04W 88/06* (2013.01); *H04W 8/183* (2013.01)

(58) Field of Classification Search
CPC ....... H04L 12/28; G06Q 30/00; H04W 88/06; H04W 8/18; H04W 8/183
USPC ........... 370/328, 329, 338, 395.21, 395.4, 370/400–401, 254–256; 455/552.1
See application file for complete search history.

(56) References Cited

U.S. PATENT DOCUMENTS

| | | | |
|---|---|---|---|
| 8,018,881 | B2 | 9/2011 | Nesargi et al. |
| 8,554,830 | B2 | 10/2013 | Wynn et al. |
| 9,131,530 | B2 * | 9/2015 | Kakkad ............. H04W 88/06 |
| 2003/0032409 | A1 | 2/2003 | Hutcheson |
| 2007/0082687 | A1 | 4/2007 | Jubelirer |
| 2008/0112363 | A1 | 5/2008 | Rahman et al. |
| 2008/0200207 | A1 | 8/2008 | Donahue |
| 2009/0157834 | A1 | 6/2009 | Krishnaswamy |
| 2009/0319329 | A1 | 12/2009 | Aggarwal |
| 2010/0167658 | A1 | 7/2010 | Hoffman |
| 2010/0217660 | A1 | 8/2010 | Biswas |
| 2010/0293404 | A1 | 11/2010 | Diab |
| 2011/0039554 | A1 | 2/2011 | Bims |
| 2012/0079567 | A1 | 3/2012 | Van De Groenendaal |

FOREIGN PATENT DOCUMENTS

| | | |
|---|---|---|
| EP | 1185028 | 3/2002 |
| WO | WO01/71682 | 9/2001 |

* cited by examiner

*Primary Examiner* — Hanh N Nguyen
(74) *Attorney, Agent, or Firm* — Rutan & Tucker LLP; Hani Z. Sayed

(57) ABSTRACT

2 Wireless devices capable of supporting multiple wireless configuration profiles are presented. A wireless device determines an environmental context, which is used to select a profile traversal method. A profile selection module configures itself to traverse available profiles according the traversals method to identify an acceptable profile. Once identified, the wireless device's communication port is configured to operate according to the profile.

13 Claims, 2 Drawing Sheets

TRAVERSAL OF WIRELESS PROFILES

This application claims the benefit of prior to U.S. patent application Ser. No. 13/890,191 filed on May 8, 2013 and U.S. provisional application 61/644,173 filed May 8, 2012. This and all other extrinsic materials discussed herein are incorporated by reference in their entirety.

FIELD OF THE INVENTION

The field of the invention is wireless communications technologies.

BACKGROUND

Deployment of wireless communication devices continue to increase across a broad spectrum of applications, including specific or dedicated applications. Many wireless applications have static environments where a wireless device typically remains in a single environmental context during its use. For example, a wireless device might only communicate with a single access point during its deployment and thus require only a single wireless configuration. However, wireless devices can also be deployed in highly dynamic environments where the wireless device can move from one context to another, or where dynamic access points create new contexts for the wireless device. In dynamic environments, wireless devices might require many different wireless configurations during its deployment. Therefore, wireless devices require an ability to shift from one operating profile to another quickly, especially in environments where the wireless device could include many possible profiles.

Others have put forth some effort toward to control or configuration of communication equipment. For example, U.S. patent application publication 2010/0293404 to Diab titled "System and Method for Dynamic Energy Efficient Ethernet Control Policy Based on User or Device Profiles and Usage Parameters", filed May 18, 2009, discusses that an Ethernet link configuration can be controlled via device-related energy efficient Ethernet profile information. Unfortunately Diab fails to provide insight into configuration of wireless profiles. U.S. patent application 2012/0079567 to Van De Groenendaal titled "Wireless Manager and Method for Configuring and Securing Wireless Access to a Network", filed Dec. 7, 2011, makes further progress by describing associating a wireless device with an access zone based on a location. Still, Van De Groenendaal also lacks insight into how a device can figure out which of many profiles could be selected.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Even though the above art is useful for their intended purposes, they do not address circumstances where a wireless device could have tens, hundreds, or thousands of operating profiles and must efficiently sort through available profiles and identify a desired profile to be used. Thus, there is still a need for wireless devices capable of selecting a way to traverse a list of available operating profiles.

SUMMARY OF THE INVENTION

The inventive subject matter provides apparatus, systems and methods in which one can have a wireless device determine how to traverse a set of possible available profiles for use within a context. One aspect of the inventive subject matter includes a wireless apparatus comprising a wireless port that can be configured according to a desired profile, a traversal rules base, wireless profile database, and profile selection module. The traversal rules base stores rules sets that govern selection of a wireless profiles and contextual criteria that outline circumstances when a traversal rules set would be applicable. The wireless profile database stores wireless profiles (e.g., configurations, attributes, etc.) corresponding to possible configurations for the wireless port. The profile selection module is preferably configured to obtain a representation of the wireless device's environmental context. The environmental context can be compared to the contextual criteria of the traversal rules sets to select a traversal rules set that is applicable to the environmental context. The profile selection module uses the selected rules set to identify a desired profile from the profiles in the wireless profile database. Once an acceptable profile is identified, the selection module can configure the wireless port to operate according to the identified wireless profile.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer/server based wireless ecosystems, various alternative configurations are also deemed suitable and may employ various computing devices including servers, devices, access points, interfaces, systems, databases, agents, peers, engines, controllers, or other types of computing devices operating individually or collectively. One should appreciate these terms are deemed to be computing devices comprising a processor configured to execute software instructions stored on a tangible, non-transitory computer readable storage medium (e.g., hard drive, solid state drive, RAM, flash, ROM, etc.). The software instructions preferably configure or program the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including obtaining a context signal indicating a contextual environment of a wireless device and generating a configuration signal that cause a wireless communication port to take on a corresponding configuration that enables to the wireless communication port to couple with other wireless devices.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within a networking context as discussed within this document, the terms "coupled to" and "coupled with" are also used euphemistically to mean "communicatively coupled with".

Figure 1:
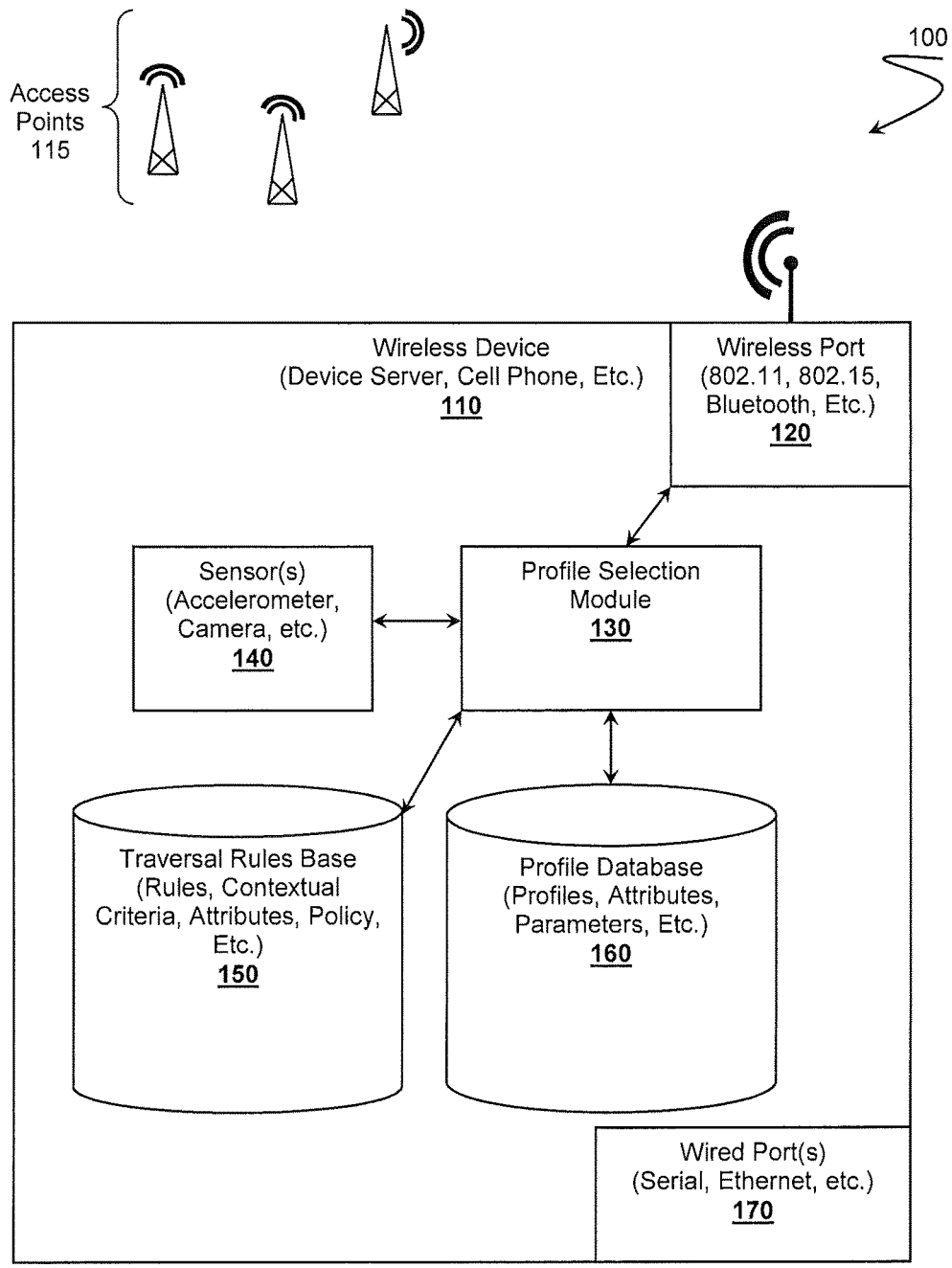
FIG. 1 is a schematic of wireless communications ecosystem.

In FIG. 1, wireless ecosystem 100 is presented where wireless device 110 can have a dynamic contextual relationship with one or more access points 115, possibly operating as a network (e.g., 802.11 network, cellular network, personal area network, Bluetooth network, etc.). The environmental context of wireless device 110 can be quite dynamic. In some scenarios, access points 115 can be moving relative to wireless device 110 or relative to each other, which results in changes to the environmental context of wireless device 110. Similarly, wireless device 110 can move relative to access points 115. As an example, consider a delivery truck having wireless device 110, which has been configured or programmed with the capability of interacting with delivery stops or other types of stops that are wirelessly accessible. Wireless device 110 could be configured or programmed to exchange pricing or inventory data at each stop. However, each stop can have different access points 115, where each stop could have a completely different configuration (e.g., channels, security settings, etc.). As the truck moves from one location to another, it's contextual environment changes in a very dynamic manner. The change in environmental context can in turn influence the wireless communication configuration of wireless device 110. At one stop, wireless device 110 could receive a request for inventory from the retailer, while at a different stop wireless device 110 might upload inventory data to a vendor's central inventory management system. Such different stops would likely require different wireless configurations. It should be appreciated that wireless device 110 could require tens, hundreds, thousands, or more wireless profiles in order to properly communicate with the myriad of access points 115 it might encounter.

Access points 115 can cover a broad spectrum of wireless network devices depending on the nature of the type of wireless communications deployed in ecosystem 100. In more preferred embodiments, access points 115 operate as network access points based on known standards; 802.11, 802.15, 802.16, etc. Other wireless standards can include wireless USB, Bluetooth®, Zigbee®, cellular standards (e.g., GSM, CDMA, TDMA, FDMA, PDMA, etc.), Near-Filed Communication (NFC), or other types of standards. Thus, access points 115 could include wireless routers such as those offered by D-Link®, NetGear®, or Cisco®; or could include cell towers. Although access points 115 are describe with respect to providing access to a network, one should appreciate that access points 115 could be another wireless device with which the wireless devices 110 exchanges data.

Wireless device 110 preferably includes one or more wireless communication ports 120 that are complimentary to the wireless technologies utilized by access points 115. In some embodiments, wireless communication port 120 comprises a radio capable of communication via a single protocol set; 802.11a, 802.11b, 802.11g, 802.11n, 802.11ac, etc. In other embodiments, wireless device 110 can include multiple wireless communication ports 120 to support different wireless communication protocols. The collection of ports 120 could include a homogenous mix of ports (e.g., all Ethernet based) or heterogeneous mix of ports (e.g., Ethernet, Cellular, short range, etc.). Still, it is also contemplated that wireless communication port 120 can include optical interfaces capable of exchanging data via other parts of the electromagnetic spectrum beyond those used in typical radios. For example, the optical interface could include a Light Emitting Diode (LED), possibly an infrared LED, or a laser.

Preferred wireless communication ports 120 are configured to obtain one or more environmental attributes associated with the wireless device's environmental context. The attributes, or other data, can be packaged as a representation of the environmental context possibly in a manner that adheres to one or more common, intermediary attribute namespaces. Such an approach allows for comparing the representation to other data objects within the system as discussed further below. Example attributes that could be encoded within the representation can include a signal type, a signal strength, a signal quality, a location, an access point parameter, a channel, a direction, a polarization, or other characteristics. Wireless device 110 can also obtain environmental attributes from other sources beyond wireless communication port 120 or the wired port 170. In the example shown, wireless device 110 can also include one or more sensors 140 that can provide sensor data that augments the representation of the environmental context. Example attributes that can be obtained from sensors 140 include a GPS location via a GPS sensor, a position, an orientation, a time, acceleration, a movement, a velocity, user-defined attributes, or other data. Examples of sensors 140 include magnetometers, GPS, accelerometers, microphones, cameras, thermometers, touch displays, Hall Effect probes, piezoelectric sensors, or other types of sensors. The information associated with the environmental context of wireless device 110 aids in the selection process of a desired profile traversal method as discussed below.

Contemplated wireless devices 110 further include profile database 160 storing multiple available wireless profiles that could be applied to configure wireless communication port 120 depending on the environmental context. In some embodiments, profile database 160 can be indexed by one or more profile properties or profile attributes allowing for quick retrieval via queries constructed based on such attribute information. Further, the profiles can be stored within a file system operating as the profile database in a memory of wireless device 110. Each profile in profile database 160 preferably comprises configuration parameter values that wireless device 110 can apply to wireless communication port 120 so that it can properly engage at least one of access points 115. Example configuration parameters can include a channel, a polarization, a security protocol, a key, a name, a direction, a power level, a quality of service parameter, a port state (e.g., hibernate, activate, etc.), or other configuration options. One should appreciate that each profile in profile database 160 can be considered a separately manageable profile object. Thus, a manager or administrator of wireless device 110 can install, remove, update, change, or otherwise modify the profile objects individually or collectively. In view that wireless device 110 could be deployed in nearly any wireless setting, one should appreciate that profile database 160 can store tens, hundreds, thousands, or more available profiles in memory.

In view there can be a large number of available profiles that could become an active profile for wireless communication port 120, preferred wireless devices 110 are configured to efficiently identify an acceptable profile quickly. Quickly identifying a desirable profile can become quite problematic due to the sheer size of profile database 160 or the large number of possible profiles that might match an environmental context query. Quick identification of a profile is considered advantageous when a time to traverse a larger number of profiles is large relative to the time to establish a connection. For example, wireless device 110 could comprise an inexpensive device having limited computational power, a Zigbee meter reader for example. Rather than sifting through all profiles to identify a most preferred profile, the wireless device can first determine a reasonable approach for traversing the profiles to find an acceptable profile, thereby reducing the time to establish a connection by determining a search rules set.

Contemplated wireless devices 110 further include traversal rules base 150 and profile selection module 130 that are both leveraged to identify a profile quickly. Traversal rules base can also operate as a database storing a plurality of rules sets that govern identification of desirable profiles where the rules database can also be stored within the memory of wireless device 110. One should appreciate that although traversal rules base 150 and profile database 160 are illustrated as being internal to wireless device 110, they could be external to wireless device 110. For example, traversal rules base 150 and profile database 160 could be accessible over wired port 170 on an external device.

Each rules set within traversal rules base 150 comprises one or more rules that are applied to traversing through relevant profiles. More preferred rules sets also include one or more contextual criteria that define circumstances under which a corresponding rules set should be applied. The contextual criteria can operate as a function of one or more context attributes, preferably within the same namespace as used to describe the environmental context. The contextual criteria can depend on one or more of the following context attributes: signal characteristics; location, position, or orientation of the wireless device or other elements; motion; velocity; user-defined attributes; an owner; a user; or other types of context attributes. Through ensuring that the context attributes and the environment attributes adhere to a common namespace, wireless device 110 is able to determine which rules sets are most relevant to the environmental context. Further, each rules set can include one or more policies that govern how the corresponding rules set is applied. Example policies could include find a first profile matching environmental context, find highest priority profile, applying user-defined policies, allow for overrides, or other types of policies.

Profile selection module 130 preferably has the responsibility of identifying a desired operating profile and causing wireless communication port 120 to take on a configuration according to the desired profile. Preferred selection modules 130 select one or more traversal rules set from the traversal rules through comparing the environment attributes derived from the representation of the environmental context to the contextual criteria for the rules sets within traversal rules base 150. For example, profile selection module 130 can construct a query comprising environmental context attributes describing the circumstance in which wireless communication port 120 finds itself. Profile selection module 130 submits the query to traversal rules base 150 to obtain a result set that comprises rules sets having contextual criteria satisfied by the attributes within the query.

Each traversal rules set in the result set can be ranked according to how well the environmental context satisfies the contextual criteria of the rules sets. If more than one rules set is returned, a simple tie breaking mechanism can be applied; select the first one or allow a user to break the tie for example. In some embodiments, the tie breaking mechanism can be industry or market sector specific. It is also contemplated that a user could select the traversal rules set. Still, more preferred embodiments allow profile selection module 130 to automatically select the traversal rules set based on comparing the representation of the environmental context to the contextual criteria as discussed previously.

Once a traversal rules set is selected, the rules set configures profile selection module 130 to operate according to the rules set and to identify a desired profile from the available wireless profiles by traversing the available profiles according to the rules set. One should appreciate that the disclosed technique is very beneficial when the number of rules sets are less than the number of possible profiles.

The traversal rules sets can operate according to a broad spectrum of instructions. In some embodiments, a rules set can construct a filtered list of profiles that are applicable to the environmental context and then traverse the list accordingly to the rules. In other embodiments the rules set can operate on all profiles in profile database 160 where all the profiles are traversed. Preferably the traversal rules set outlines how profile selection module 130 should traverse the available profiles. Example traversal rules operating on a list of available profiles could include one or more of the following: traversing the list top-down, traverse a ranked list to evaluate the profiles, traverse the list according to when the profiles were used (e.g., last used, most recently used, etc.), traverse the list according to security requirements, traverse the list in a round-robin fashion, re-order a list then traverse, or other methods of traversal. All traversal rules are contemplated. Regardless of how the profiles are traversed, profile selection module 130 uses the identified profile to cause wireless communication port 120 to take on the corresponding configuration so that it operates according to the selected desired profile.

It is contemplated that wireless device 110 can also include a management interface (not shown) that allows one or more managers to access and manage wireless device 110. The management interface can be accessed via wireless communication port 120, a wired port 170 (e.g., serial, Ethernet, etc.), shared memory, or other type of communication port. The management interface can be implemented as a web server, command line interface (CLI), a serial protocol, a packet protocol, an application program interface (API), or other type of interface.

The management interface can further provide management capabilities to allow the manager or administrator to modify various aspects of the wireless device. For example, a user can access the management interface to manage the traversal rules sets (e.g., delete, install, edit, modify, etc.). Thus, a user can submit new traversal rules sets and store the new rules sets in traversal rules base 150. Further, the user could use the management interface to manage the profiles in profile database 160 (e.g., add, delete, re-order, insert, change attributes, etc.).

Especially preferred wireless devices 110 comprise a wireless device server configured with wireless communication port 120, the traversal rules base, the profile database, and the profile selection module. Suitable device servers that can be adapted for use with the inventive subject matter includes those developed by Lantronix® (e.g., Premier-Wave, WiPort, etc.) or Digi International® (e.g., Rabbit MiniCore®, XBee-Pro™, ConnectCore™, etc.). One should appreciate that the device server can be an embedded device server capable of integrating on a PCB board of target computing device, or an external device server capable of coupling with a legacy device possibly via wired port 170. The device servers can integrate with existing or legacy devices to form the disclosed wireless device in FIG. 1. Example existing devices could include projectors, medical devices, gaming device, meters, sensors, appliances, vehicles, spacecraft, vending machines, displays, field equipment, test equipment, or other types of devices.

As illustrated in FIG. 1, more preferred wireless devices 110 also include one or more wired ports as illustrated (e.g., serial port, Ethernet port, memory port, PCI bus, etc.). In such embodiments, the representation of the environmental context can also depend on data obtained via wired port 170. For example, the environmental context can depend on information relating to the device to which wired port 170 is connected. In a medical context, wireless device 110 could be coupled with an infusion pump only having a serial port via wired port 170. The status of the infusion pump obtained via the serial port can be incorporated into the decision process for selecting a traversal rules set.

Figure 2:
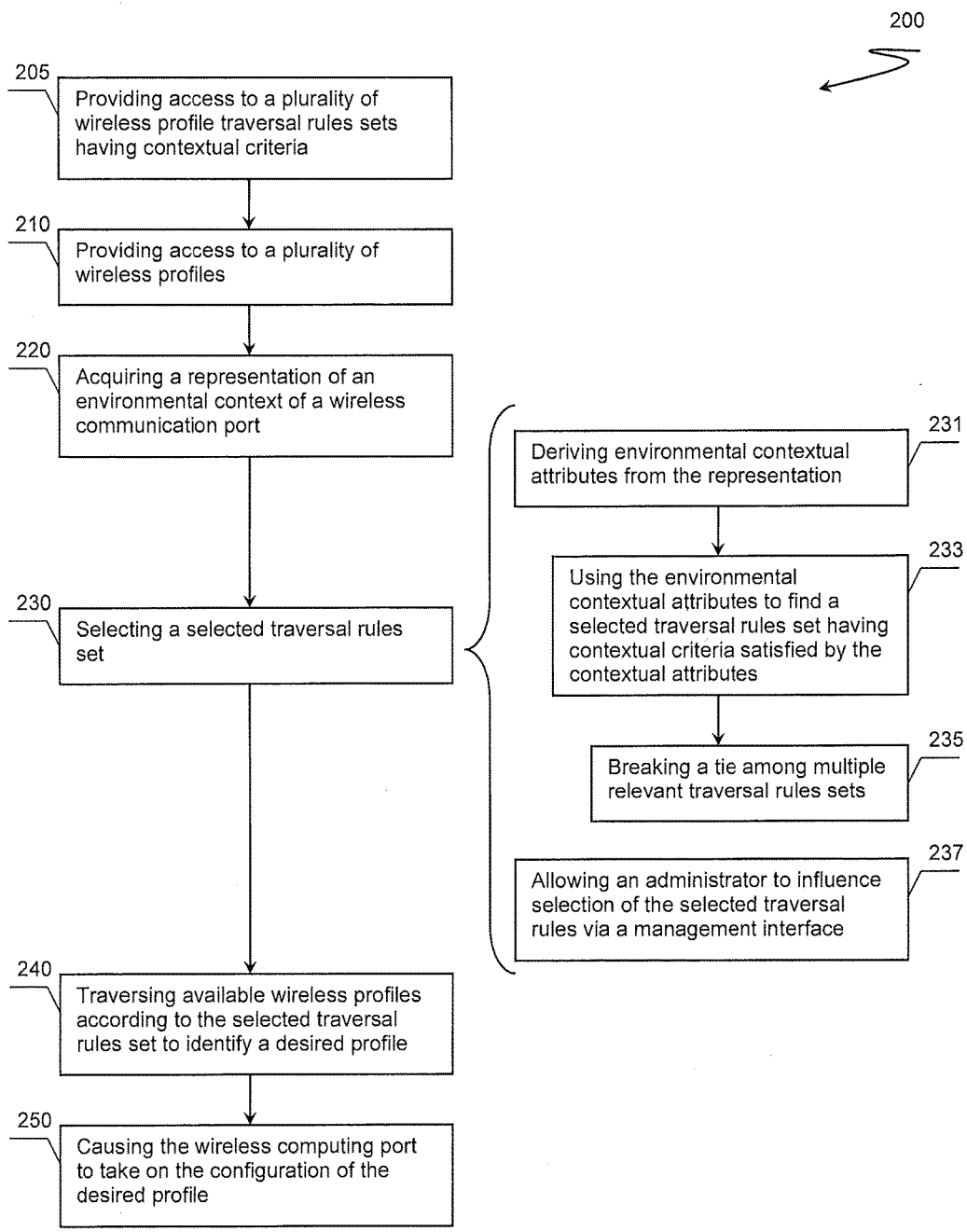
FIG. 2 represents a schematic for a method of configuring a wireless port.

FIG. 2 presents method 200 of configuring a wireless port. Method 200 allows a wireless device to configure its wireless port according to a desirable wireless profile when multiple profiles are available. The desirable wireless profile is identified through selecting a contextually relevant profile traversal rules set. One should appreciate that the following steps are can be executed by a processor on the wireless device. Contemplated wireless devices include device servers having a processor that execute instructions stored in a memory of the device, and a wireless port.

Step 205 includes providing access to a plurality of wireless profile traversal rules sets, where each rules set comprises contextual criteria. Wireless devices can be a priori provisioned with traversal rules sets in a rules base (e.g., file in a file system, files, database, look up table, etc.) before deployment in the field. Alternatively, a wireless device can be updated in the field with the traversal rules sets via a management interface (e.g., web server, CLI, SSH, API, etc.). Further, the step of providing access to the plurality of wireless profile rules sets can also include allowing a wireless device to access the rules sets over a network, possibly via a cloud-based service. Each traversal rules set can include environmental or contextual attributes indicating conditions when the rules set are relevant. Thus, the contextual criteria can be defined in terms of environmental contextual attributes. For example, the rules sets can be stored in the traversal rules base as indexed by relevant attributes.

Step 210, in a similar vein, includes providing access to a plurality of wireless profiles where each profile can be considered a set of wireless port configuration parameters. Each profile includes parameters that govern the behavior of a target wireless port. The profile can include power consumption policies, channel selection policies, security features, or other parameters that configure the port. In some embodiments, the number of profiles available can be quite large, which can be prohibitive to search through on cost-efficient processors.

Step 220 includes acquiring a representation of an environmental context of a wireless communication port. For example, the wireless device can obtain sensed wireless environment properties from the wireless communication port where the representation comprises digital information representing the properties of the wireless port (e.g., signal strength, available channels, spectrums, etc.). Further, the environmental context could include non-wireless port information possibly including sensor data (e.g., GPS, accelerometry, magnetometer, user input, etc.), data obtained from a legacy device through a wired port, external data, or other types of data.

Step 230 can comprise selecting a selected traversal rules set as a function of the representation of the environmental context. For example, at step 231, the wireless device, possibly through a profile section module as discussed with respect to FIG. 1, uses the representation of the environmental context to derive one or more attributes. The derived attributes can be considered to define a context within which the wireless device exists. In some embodiments, the contexts can be treated as data objects indicating a specifically or a priori defined context (e.g., hibernation, delivery, stationary, traveling, etc.) depending on the nature of the wireless device. At step 233, the wireless device uses the environmental contextual attributes to find a selected traversal rules set having contextual criteria satisfied by the attributes.

One possible technique for finding the selected traversal rules set includes constructing a query based on the attributes where the query is submitted to a traversal rules database as discussed previously. Another possible technique includes identifying an a priori defined context object stored in the memory of the wireless device and representing a context in which the wireless device could exist. The context object can be defined in terms of relevant environmental context attributes. Contemplated context objects can include data members, or criteria having conditions or requirements expressed according to possible values of the environmental context attributes (e.g., geolocation, signal strength, legacy device model number, etc.). Additionally, the context objects can include data members that include or reference one or more corresponding or relevant traversal rules sets. As an example, consider a delivery truck. When the delivery truck is on a delivery run, it might have a corresponding context for "delivery mode". When the delivery mode context is active, the corresponding traversal rules sets can be selected. However, at night the truck might have a corresponding context for "maintenance mode" where the maintenance mode context references or includes different corresponding traversal rules sets.

As suggested by step 235, it is possible to identify more than one traversal rules sets. Thus, step 235 includes breaking a tie among multiple relevant traversal rules sets. Ties can be broken by ranking relevant rules and selecting the highest ranked rule, allowing an administrator to influence selection of the rules via a management interface (i.e., step 237), or other tie breaking technique. Referring back to the delivery truck example, the delivery truck might exist within a delivery mode context throughout the day. During the day, the wireless device might identify a plurality of traversal rule sets that are relevant to the delivery mode context. The wireless device can break ties among the rules set by using the truck's GPS position where the tie among traversal rules sets could be broken by geo-location.

Step 240 can include traversing available wireless profiles according to the selected traversal rules set to identify a desired wireless profile. The selected traversal rules set can include one or more policies that govern how available, possibly contextually relevant, wireless profiles are traversed or selected. In some embodiments, the policies could require contextually relevant profiles to be ranked according to one or more attributes and the highest ranked profile might be selected. In other embodiments, the policies might require applying a user-defined or business rule to select a profile. Still, in other embodiments, the policies might try applying multiple profiles to the wireless port, then selecting the profile that yields the most optimized metric (e.g., strongest signal, strongest security, lowest power consumption, etc.).

Upon identifying the desired wireless profile, step 250 includes configuring the wireless profile to operate according the desired profile. The wireless device can cause the wireless port to take on the configuration through various techniques. In some embodiments, the wireless device can make calls a driver API of the wireless port to set operating parameters (e.g., channel selection, buffer sizes, etc.). In other embodiments, the wireless device can dynamically manage the wireless port, possibly in real-time, via one or more management APIs or modules. For example, the wireless device could toggle power to the wireless port radio according the desired wireless profile.

One should appreciate that the disclosed techniques are especially beneficial in environments where the wireless device operates as a device server attached to legacy devices. In such environments, the traversal rules sets can be selected based on information obtained from legacy device. For example, the wireless device can couple with a medical device, a smart meter, a vending machine, an appliance, a vehicle, or other type of legacy device that provides information that can give rise to environmental context attribute values, which could aid in selecting wireless profile traversal rules sets.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A wireless apparatus comprising:
a heterogeneous mix of wireless communication ports configured to acquire a representation of their environmental contexts, a first subset of the wireless communication ports configured to communicate via a single protocol set, a second subset configured to communicate via a plurality of protocol sets;
a traversal rules base storing a plurality of traversal rules sets, each traversal rules set governing selection of a wireless profile and comprising contextual criteria;
a profile database storing a plurality of available wireless profiles for the wireless communication port; and
a profile selection module configured to:
select a selected traversal rules set from the plurality of traversal rules sets by comparing the representation of the environmental context to the contextual criteria of the traversal rules sets,
identify a desired profile from the available wireless profiles by traversing profiles according to the selected traversal rules set,
configure the wireless communication port to operate according to the desired profile; and
the contextual criteria comprising context attributes, the representation of the environmental context comprising environment attributes adhering to a namespace of the contextual attributes; and
a plurality of sensors configured to augment the representation of the environmental context, the plurality of sensors comprising any one of a GPS sensor, position sensor, camera and accelerometer.

2. The apparatus of claim 1, the wireless apparatus further comprising a management interface configured so as to provide device access and management.

3. The apparatus of claim 1, wherein the context attributes comprise at least one of the following: a signal strength, a signal type, a signal quality, a location, a position, an orientation, a time, a motion, an acceleration, a velocity, an access point parameter, and a user-defined attribute.

4. The apparatus of claim 1, wherein the selected traversal rules set comprise a policy for identifying the desired profile.

5. The apparatus of claim 1, wherein the wireless communication port operates according to at least one of the following: 802.11, 802.15, 802.16, Wireless USB, Bluetooth, NFC, cellular, and Zigbee.

6. The apparatus of claim 1, further comprising a device server comprising the wireless communication port, the traversal rules base, the profile database, and the profile selection module.

7. The apparatus of claim 6, wherein the device server further comprises a wired port communicatively coupled with the wireless communication port.

8. The apparatus of claim 7, wherein the representation of the environmental context comprises data obtained from the wired port.

9. The apparatus of claim 7, wherein the wired port comprise a serial port.

10. The apparatus of claim 7, wherein the wired port comprises an Ethernet port.

11. The apparatus of claim 1, wherein the selected profile comprises at least one of the following wireless port configuration parameters: a security protocol, a key, a channel, a name, a direction, a power level, a Quality of Service parameter, and a port state.

12. The apparatus of claim 1, further comprising a traversal rules interface configured to allow management of the traversal rule sets wherein the travel rules interface is configured to accept a submitted traversal rules set and store the submitted traversal rules set in the traversal rules database and further wherein the interface comprises at least one of a web server, an API, command line interface (CLI), a serial protocol, and a packet protocol operating over a communication port.

13. The apparatus of claim 1, wherein the profile selection module is further configured to select automatically the selected traversal rule set based on comparing the representation of the environmental context to the contextual criteria of the traversal rules sets.

\* \* \* \* \*